United States Patent
Ogawa

(10) Patent No.: US 10,754,444 B2
(45) Date of Patent: Aug. 25, 2020

(54) ELECTRONIC APPARATUS AND CONTROL METHOD THEREFOR

(71) Applicant: CANON KABUSHIKI KAISHA, Tokyo (JP)

(72) Inventor: Seiji Ogawa, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/239,722

(22) Filed: Jan. 4, 2019

(65) Prior Publication Data

US 2019/0212833 A1 Jul. 11, 2019

(30) Foreign Application Priority Data

Jan. 5, 2018 (JP) ................................ 2018-000557

(51) Int. Cl.
| | |
|---|---|
| *G06F 3/0346* | (2013.01) |
| *G06F 3/0481* | (2013.01) |
| *G06F 3/01* | (2006.01) |
| *H04N 21/4728* | (2011.01) |
| *G09G 5/00* | (2006.01) |

(Continued)

(52) U.S. Cl.
CPC ....... *G06F 3/0346* (2013.01); *G02B 27/0172* (2013.01); *G06F 3/011* (2013.01); *G06F 3/012* (2013.01); *G06F 3/04815* (2013.01); *G09G 5/00* (2013.01); *H04N 5/23238* (2013.01); *H04N 21/4728* (2013.01); *H04N 21/816* (2013.01); *G06F 3/04883* (2013.01)

(58) Field of Classification Search
CPC ..... G02B 27/0172; G06F 3/011; G06F 3/012; G06F 3/0346; G06F 3/04815; G06F 3/04883; G06F 3/0425; G09G 5/00; H04N 21/4728; H04N 21/816; H04N 5/23238; H04N 5/85; H04N 5/23229; H04N 5/23267; G06T 19/00; G06T 19/006

See application file for complete search history.

(56) References Cited

U.S. PATENT DOCUMENTS

| | | | |
|---|---|---|---|
| 2006/0210240 A1* | 9/2006 | Kitamura | H04N 5/85 386/241 |
| 2009/0243968 A1* | 10/2009 | Nakazawa | G06F 3/0425 345/8 |

(Continued)

FOREIGN PATENT DOCUMENTS

JP 2016-201714 A 12/2016

*Primary Examiner* — Richard J Hong

(74) *Attorney, Agent, or Firm* — Cowan, Liebowitz & Latman, P.C.

(57) ABSTRACT

An electronic apparatus includes: a detection unit configured to detect a posture of a display unit; a reproduction unit configured to reproduce a moving image; a change unit configured to change a display range according to the posture of the display unit; and a control unit configured to perform control so that in a case where a first frame of the moving image is reproduced, a main object is displayed on the display unit regardless of whether the posture is a first posture or a second posture, and perform control so that in a case where a second frame, which is different from the first frame, of the moving image is reproduced, the display range differs between a case where the detected posture is the first posture and a case where the detected posture is the second posture.

11 Claims, 10 Drawing Sheets

(51) Int. Cl.
  *H04N 5/232*    (2006.01)
  *H04N 21/81*    (2011.01)
  *G02B 27/01*    (2006.01)
  G06F 3/0488    (2013.01)

(56)  References Cited

U.S. PATENT DOCUMENTS

2011/0158478 A1\* 6/2011 Yamada .................. G06F 3/011
  382/103
  2015/0244944 A1\* 8/2015 Tokutake ........... H04N 5/23229
  348/239
  2016/0011420 A1\* 1/2016 Jang ........................ G06F 3/012
  345/8
  2016/0133051 A1\* 5/2016 Aonuma ............... G06T 19/006
  345/633
  2016/0216792 A1\* 7/2016 Ogawa .................... G06F 3/011
  2018/0190036 A1\* 7/2018 Kim ...................... G06T 19/00
  2018/0227487 A1\* 8/2018 Heo ................... H04N 5/23267

\* cited by examiner

ELECTRONIC APPARATUS AND CONTROL METHOD THEREFOR

BACKGROUND OF THE INVENTION

Field of the Invention

The present invention relates to electronic apparatus, a method for controlling the electronic apparatus, a program, and a storage medium, and more particularly to a technique for displaying a moving image having a wide-range video image.

Description of the Related Art

For omnidirectional moving images and moving images with a wide viewing angle, a range that a user can view at one time is limited. Japanese Patent Application Publication No. 2016-201714 discloses a method by which when a moving image is reproduced, a user is allowed to see a highlight of the moving image by automatically switching a display range to a viewing direction in which a larger number of users are looking in a wide-range image.

SUMMARY OF THE INVENTION

However, in the related art disclosed in Japanese Patent Application Publication No. 2016-201714, when there is a highlight, a portion of the highlight is displayed at all times, so that only the viewing direction in which many users are looking is displayed. Therefore, even when the user wishes to see another portion, the other portion is not displayed and, therefore, cannot be seen by the user. Meanwhile, where information such as a highlight is not shown, the user may see a portion other than the highlight and may not notice the highlight.

The present invention provides a technique to improve the visibility when a user views a moving image in which a part of a wide-range image is displayed.

An electronic apparatus according to the present invention includes:
 a detection unit configured to detect a posture of a display unit;
 a reproduction unit configured to be capable of reproducing a moving image;
 a change unit configured to change a display range, which is a partial range of an image and is a range to be displayed on the display unit, according to the posture of the display unit detected by the detection unit; and
 a control unit configured to perform control so that in a case where a first frame of the moving image is reproduced, a main object is displayed on the display unit regardless of whether the posture detected by the detection unit is a first posture or a second posture, and perform control so that in a case where a second frame, which is different from the first frame, of the moving image is reproduced, the display range differs between a case where the detected posture is the first posture and a case where the detected posture is the second posture.

According to the present invention, it is possible to improve the visibility when the user is viewing a moving image in which a part of a wide-range image is displayed.

Further features of the present invention will become apparent from the following description of exemplary embodiments with reference to the attached drawings.

DESCRIPTION OF THE EMBODIMENTS

Example 1

Hereinafter, an electronic apparatus according to Example 1 of the present invention will be described. The electronic apparatus according to Example 1 is capable of reproducing a moving image. In Example 1, an editing method and a reproduction method of a moving image of the so-called digest system in which one moving image file is obtained by joining together a plurality of moving image data or extracting a plurality of portions of moving image data of one long period of time will be explained by way of example.

Figure 1A:
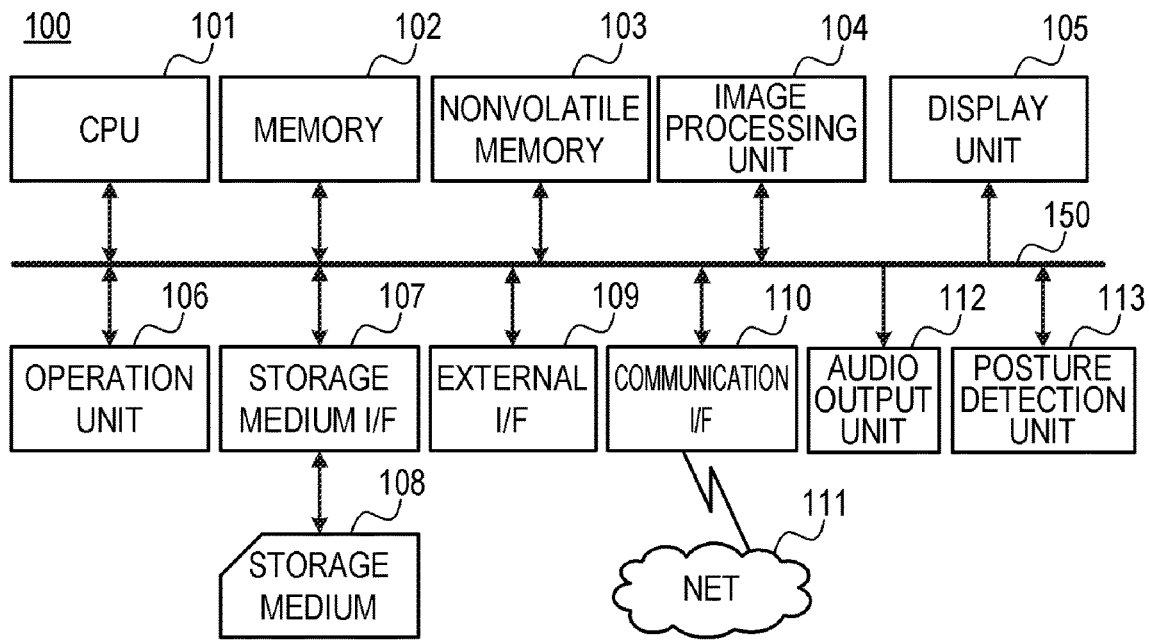
FIG. 1A illustrates an example of a configuration of an electronic apparatus according to Examples 1 and 2.

FIG. 1A shows an example of a configuration of an electronic apparatus 100 as an example of a display control apparatus to which the present invention can be applied. The electronic apparatus 100 can be configured using a display apparatus such as a smartphone.

In FIG. 1A, a CPU 101, a memory 102, a nonvolatile memory 103, an image processing unit 104, a display unit 105, an operation unit 106, a storage medium I/F 107, an external I/F 109, and a communication I/F 110 are connected to an internal bus 150. An audio output unit 112 and a posture detection unit 113 are also connected to the internal bus 150. The units connected to the internal bus 150 are configured to be capable of exchanging data with each other via the internal bus 150.

The CPU 101 is a control unit that controls the entire electronic apparatus 100, and is composed of at least one processor. The memory 102 is composed of, for example, a RAM (a volatile memory using semiconductor elements, and the like). The CPU 101 controls each unit of the electronic apparatus 100 by using the memory 102 as a work memory in accordance with a program stored in, for example, the nonvolatile memory 103. The nonvolatile memory 103 stores image data, audio data, other data, various programs for the CPU 101 to operate, and the like. The nonvolatile memory 103 is composed of, for example, a flash memory or a ROM.

Under the control of the CPU 101, the image processing unit 104 performs image processing of an image stored in the nonvolatile memory 103 or the storage medium 108, a video image signal acquired via the external I/F 109, an image acquired via the communication I/F 110, and the like. The image processing performed by the image processing unit 104 includes A/D conversion processing, D/A conversion processing, image data encoding processing, compression processing, decoding processing, enlargement/reduction processing (resizing), noise reduction processing, color conversion processing and the like. In addition, various types of image processing such as panorama expansion, mapping processing, conversion, and the like of an omnidirectional image or a wide-range image which is not omnidirectional but has wide-range data are also performed. The image processing unit 104 may be constituted by a dedicated circuit block for performing specific image processing. Further, depending on the type of image processing, it is also possible for the CPU 101 to perform image processing according to a program, without using the image processing unit 104.

Under the control of the CPU 101, the display unit 105 displays an image or a GUI screen constituting a GUI (Graphical User Interface). The CPU 101 generates display control signals in accordance with the program, and controls each unit of the electronic apparatus 100 so as to generate a video image signal to be displayed on the display unit 105 and output the generated video image signal to the display unit 105. The display unit 105 displays a video image on the basis of the output video image signal. The configuration of the electronic apparatus 100 itself may be an interface for outputting a video image signal for display on the display unit 105, and the display unit 105 may be configured of an external monitor (television or the like).

The operation unit 106 is an input device for receiving a user operation, such as a character information input device such as a keyboard and the like, a pointing device such as a mouse or a touch panel, a button, a dial, a joystick, a touch sensor, a touch pad, and the like. The touch panel is an input device configured to be superimposed on the display unit 105 in a planar manner and configured to output the coordinate information corresponding to the touched position.

A storage medium 108 such as a memory card, a CD, and a DVD can be mounted on the storage medium I/F 107 which, under the control of the CPU 101, reads data from the attached storage medium 108 or writes data to the storage medium 108. The external I/F 109 is an interface for connecting with an external apparatus via a wired cable or wirelessly, and for inputting and outputting video image signals and audio signals. The communication I/F 110 is an interface for communicating with an external apparatus, Internet 111, and the like to transmit and receive various data such as files and commands.

The audio output unit 112 outputs sounds of moving images and music data, operation sounds, incoming sounds, various notification sounds, and the like. Although the audio output unit 112 includes the audio output terminal 112*a* and a speaker 112*b* for connecting earphones and the like, the audio output may be performed by wireless communication or the like.

The posture detection unit 113 detects (senses) the posture of the electronic apparatus 100 with respect to the direction of gravity. Based on the posture detected by the posture detection unit 113, it can be determined whether the electronic apparatus 100 is held sideways, is held vertically, is directed upward, turned downward, is in an inclined posture, or the like. At least one of an acceleration sensor, a gyro sensor, a geomagnetic sensor, a direction sensor and the like can be used as the posture detection unit 113, and a plurality of such devices can be used in combination.

The operation unit 106 includes a touch panel 106*a*. The CPU 101 can detect the following operation or state on the touch panel 106*a*.

That a finger or a pen that did not touch panel 106*a* newly touched the touch panel 106*a*, that is, the start of touch (hereinafter referred to as "touch-down").

A state in which a finger or a pen is touching the touch panel 106*a* (hereinafter referred to as "touch-on").

That a finger or a pen is moving while touching the touch panel 106*a* (hereinafter referred to as a "touch-move").

That a finger or a pen that has been touching the touch panel 106*a* has separated from the touch panel 106*a*, that is, the end of touch (hereinafter referred to as "touch-up").

A state in which nothing is touched on the touch panel 106*a* (hereinafter referred to as "touch-off").

When a touch-down is detected, a touch-on is detected at the same time. After the touch-down, as long as a touch-up is not detected, normally the touch-on is continuously detected. When a touch-move is detected, the touch-on is also detected at the same time. Even if the touch-on is detected, the touch-move is not detected unless the touch position has moved. A touch-off is detected when it is detected that all the touched fingers and pens have touched-up.

These operations/states and coordinates of the position where the finger or the pen is touching the touch panel 106*a* are notified to the CPU 101 through the internal bus, and the CPU 101 determines what kind of operation (touch operation) has been performed on the touch panel 106*a* on the basis of the notified information. Regarding the touch-move, the movement direction of the finger or the pen moving on the touch panel 106*a* can also be determined for each vertical component and horizontal component on the touch panel 106*a* on the basis of a change in position coordinates. Where it is determined that the touch-move has been performed through a predetermined distance or more, it is determined that a slide operation has been performed. An operation of moving a finger on the touch panel 106*a* quickly through a certain distance while touching the touch panel and then separating the finger from the panel is called a flick. In other words, the flick is an operation of tracing quickly on the touch panel 106*a* with a finger as if the finger is being repelled by the panel. Where it is detected that a touch-move has been performed through a predetermined distance or more at a predetermined speed or faster and a touch-up is detected as it is, it can be determined that a flick has been performed (it can be determined that the flick took place following the slide operation). Further, a touch operation for touching a plurality of points (for example, two points) at the same time and bringing the touch positions close to each other is referred to as "pinch-in", and a touch operation for moving the touch positions away from each other is referred to as "pinch-out". The pinch-out and pinch-in are collectively referred to as a pinch operation (or simply "pinch"). A touch panel of any system, for example, a resistance film system, a capacitance system, a surface acoustic wave system, an infrared system, an electromagnetic induction system, an image recognition system, an optical sensor system, and the like may be used as the touch panels 106*a*. There are a system in which a touch is detected by contact with the touch panel, and a system in which a touch is detected by approach of a finger or a pen to the touch panel, and either of these systems may be used.

Figure 1B:
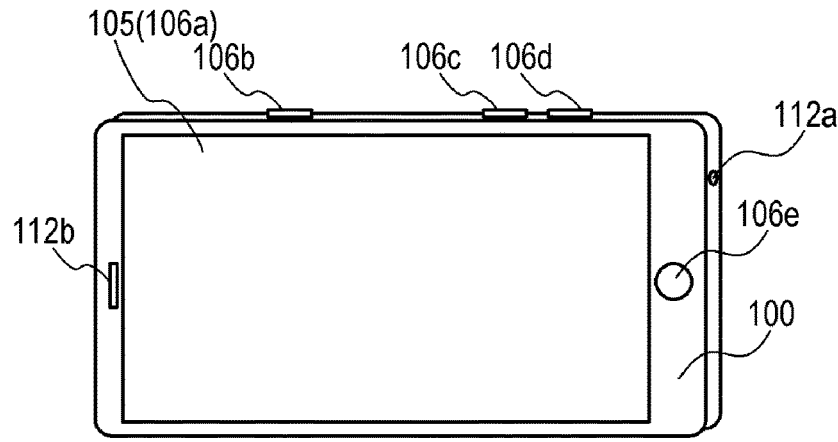
FIG. 1B illustrates an example of external appearance of the electronic apparatus according to Examples 1 and 2.

FIG. 1B shows an example of an external view of the electronic apparatus 100. The display unit 105 displays images and various information. As described above, the display unit 105 is configured integrally with the touch panel 106a and can detect a touch operation on the display surface of the display unit 105. The operation unit 106 includes operation units 106b, 106c, 106d, and 106e as shown in the figure. The operation unit 106b is a power supply button for receiving an operation of switching on and off the power supply of the electronic apparatus 100. The operation unit 106c and the operation unit 106d are volume buttons for increasing/decreasing the volume of sound output from the audio output unit 112. The operation unit 106e is a home button for displaying a home screen on the display unit 105.

Figure 1C:
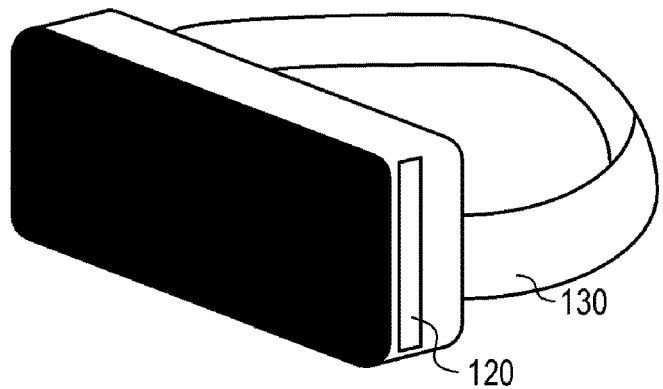
FIG. 1C illustrates an example of external appearance of the head-mounted adapter according to Examples 1 and 2.

FIG. 1C shows an external view of a head-mounted adapter which is VR (Virtual Reality) goggles on which the electronic apparatus 100 can be mounted. The electronic apparatus 100 can also be used as a head-mounted display by being mounted on the VR goggles. An insertion opening 120 is for inserting the electronic apparatus 100. The entire electronic apparatus 100 can be inserted into the VR goggles so that the display surface of the display unit 105 faces the headband 130 side (that is, the user side) for fixing the VR goggles to the head of the user. As a result of mounting the VR goggles on which the electronic apparatus 100 has been mounted in this way, the user can visually recognize the display unit 105 of the electronic apparatus 100, without holding the electronic apparatus 100 by hand, in a state in which the VR goggles are mounted on the head. In this case, when the user moves the head or the entire body, the posture of the electronic apparatus 100 also changes. The posture detection unit 113 detects a change in the posture of the electronic apparatus 100 at this time, and the CPU 101 performs the below-described VR display (VR display processing) on the basis of the change in the posture. In this case, detecting the posture of the electronic apparatus 100 by the posture detection unit 113 is equivalent to detecting the posture of the user's head (the direction of the line of sight of the user).

The electronic apparatus 100 can perform VR display of a VR image (VR content) on the display unit 105.

The VR image, as referred to herein, is an image that can be VR displayed. The VR image is assumed to be inclusive of an omnidirectional image (entire-sphere image) captured by an omnidirectional camera (entire-sphere camera) and a panoramic image having a wider video image range (effective video image range) than the display range that can be displayed on the display unit 105 at one time. Images that can be VR displayed, which are not only images captured by cameras but also images created using computer graphics (CG), are assumed to be included in VR images (VR content). The VR images are inclusive of not only still images but also of moving images and live view images (images acquired from a camera in nearly real time). A VR image has a video image range (effective video image range) of the field of view of 360 degrees at maximum in the vertical direction (vertical angle, angle from the zenith, elevation angle, depression angle, altitude angle) and 360 degrees at maximum in the lateral direction (horizontal angle, azimuth angle). Further, it is also assumed that VR images are also inclusive of images having a wide field angle (viewing range) which is wider than the field angle that can be captured by a normal camera, even when the angle is less than 360 degrees in the vertical direction and less than 360 degrees in the lateral direction, or having a wider video image range (effective video image range) than the display range that can be displayed on the display unit 105 at one time. For example, an image captured by an entire-sphere camera capable of capturing an object in a field of view (field angle) with a lateral direction (horizontal angle, azimuth angle) of 360 degrees and a vertical angle of 210 degrees centered on the zenith is a VR image. That is, an image having a video image range of a field of view of 180 degrees (±90 degrees) or more in the vertical direction and the lateral direction and a wider video image range than a range that a human can visually recognize at one time is a VR image. When this VR image is VR displayed, by changing the posture in the lateral rotation direction, it is possible to view a seamless omnidirectional video image in the lateral direction (horizontal rotation direction). In the vertical direction (vertical rotation direction), a seamless omnidirectional video image can be viewed in the range of ±105 degrees when viewed from directly above (zenith), but in the range exceeding 105 degrees from directly above, a blank area without a video image is obtained. The VR image can also be said to be "an image for which a video image range is at least a part of a virtual space (VR space)".

The VR display, as referred to herein, is a display method by which it is possible to change a display range in which a video image, in the VR image, in a viewing range corresponding to the posture of the electronic apparatus 100 detected by the posture detection unit 113 is displayed. When the electronic apparatus 100 is mounted on the VR goggles and viewed, video images in the viewing range corresponding to the orientation of the face of the user are displayed. For example, it is assumed that a video image, in the VR image, with a viewing angle (angle of field) centered on 0 degree in the lateral direction (specific direction, for example, northward) and 90 degrees in the vertical direction (90 degrees from the zenith, that is, horizontal) at a certain point in time is displayed. Where the posture of the electronic apparatus 100 is reversed from this state (for example, when the display surface is changed from the southward direction to the northward direction), the display range is changed to a video image, in the same VR image, having a viewing angle centered on 180 degrees in the lateral direction (the opposite direction, for example, southward) and 90 degrees in the vertical direction (horizontal). For example, when the user views the electronic apparatus 100 mounted on the VR goggles, where the user points the face from the north to the south (that is, turns to the back), the video image displayed on the electronic apparatus 100 changes from the video image of the north to the video image of the south. With such VR display, it is possible to provide the user with a feeling that the user is visually in the VR image (within the VR space).

Figure 2A:
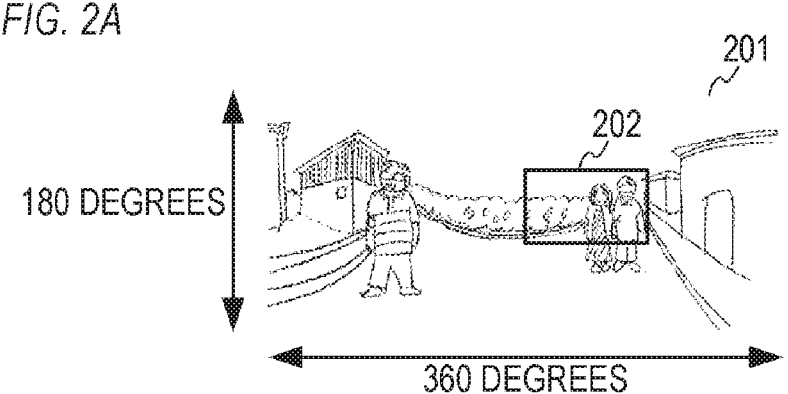
FIG. 2A illustrates an example of a VR image according to Examples 1 and 2.
Figure 2B:
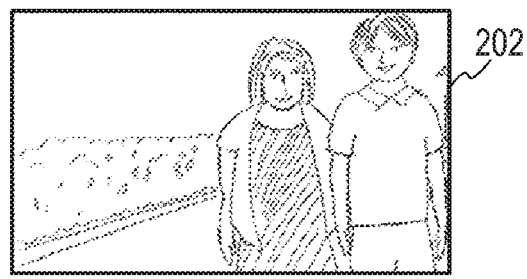
FIG. 2B illustrates an example of display according to Examples 1 and 2.

A specific example of VR display will be described hereinbelow. FIG. 2A shows a VR image 201 having a video image range of a field of view of 180 degrees in the vertical direction and 360 degrees in the lateral direction. At the time of VR display, as shown in FIG. 2A, a partial range 202 of the VR image 201 is determined as a display range in accordance with the posture of the electronic apparatus 100 detected by the posture detection unit 113. Then, as shown in FIG. 2B, the video image of the display range 202 is displayed on the display unit 105. The display range 202 changes following the posture change of the electronic apparatus 100. For example, when the user is viewing the electronic apparatus 100 mounted on the VR goggles, where the user turns the face to the left, the display range 202 moves to the left, and where the user turns the face upward, the display range 202 moves up.

Figure 2C:
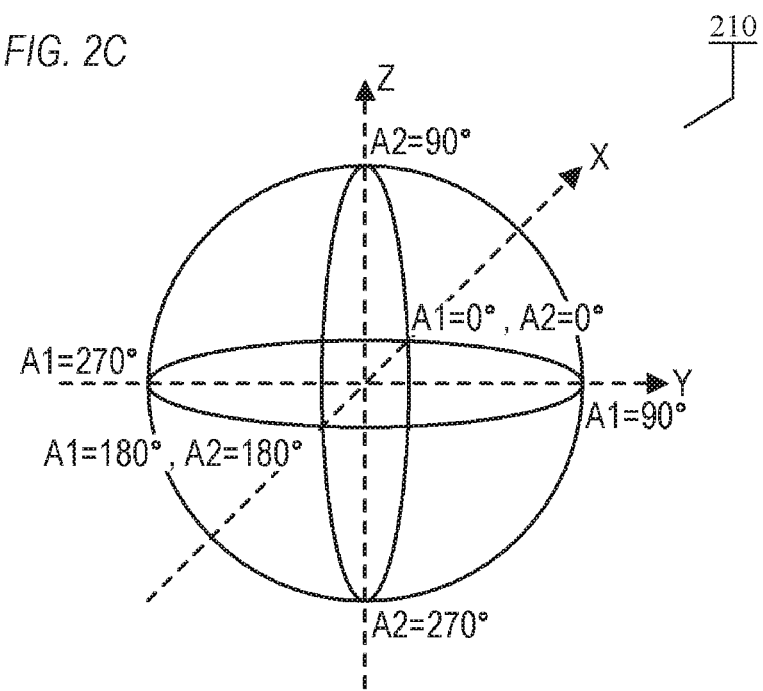
FIG. 2C illustrates an example of a VR space according to Examples 1 and 2.

FIG. 2C shows a VR space 210. As shown in FIG. 2C, in VR display, the user can be provided with an immersive feeling or a realistic feeling as if he or she is in the VR space 210. The display position (position of the display range) of VR display can be represented by using an angle A1 in an XY axis plane (plane in the front-rear direction and lateral direction) and an angle A2 in an XZ-axis plane (plane in the vertical direction). The angle A1 can also be said to be "the rotation angle around a Z axis (vertical direction) in the direction passing through the center position (position of the user) of the VR space 210 and the display position". The angle A2 can also be said to be "the rotation angle about a Y axis, which is perpendicular to the Z axis, in the direction passing through the center position of the VR space 210 and the display position". When the electronic apparatus 100 rotates around the Z axis, the angle A1 changes and the display position 211 changes. When the electronic apparatus 100 rotates about the Y axis, the angle A2 changes and the display position changes. When the user is viewing the electronic apparatus 100 mounted on the VR goggle, where the user swings the face to the right or the left, the angle A1 changes, and where the user swings the face up and down, the angle A2 changes. It is also possible to change the display position by changing the angles A1, A2 by a touch operation (slide operation or flick) on the touch panel 106*a*. When the display position is determined, the display range centered on the display position is determined. The size of the display range varies according to the enlargement ratio of the VR image.

Figure 3:
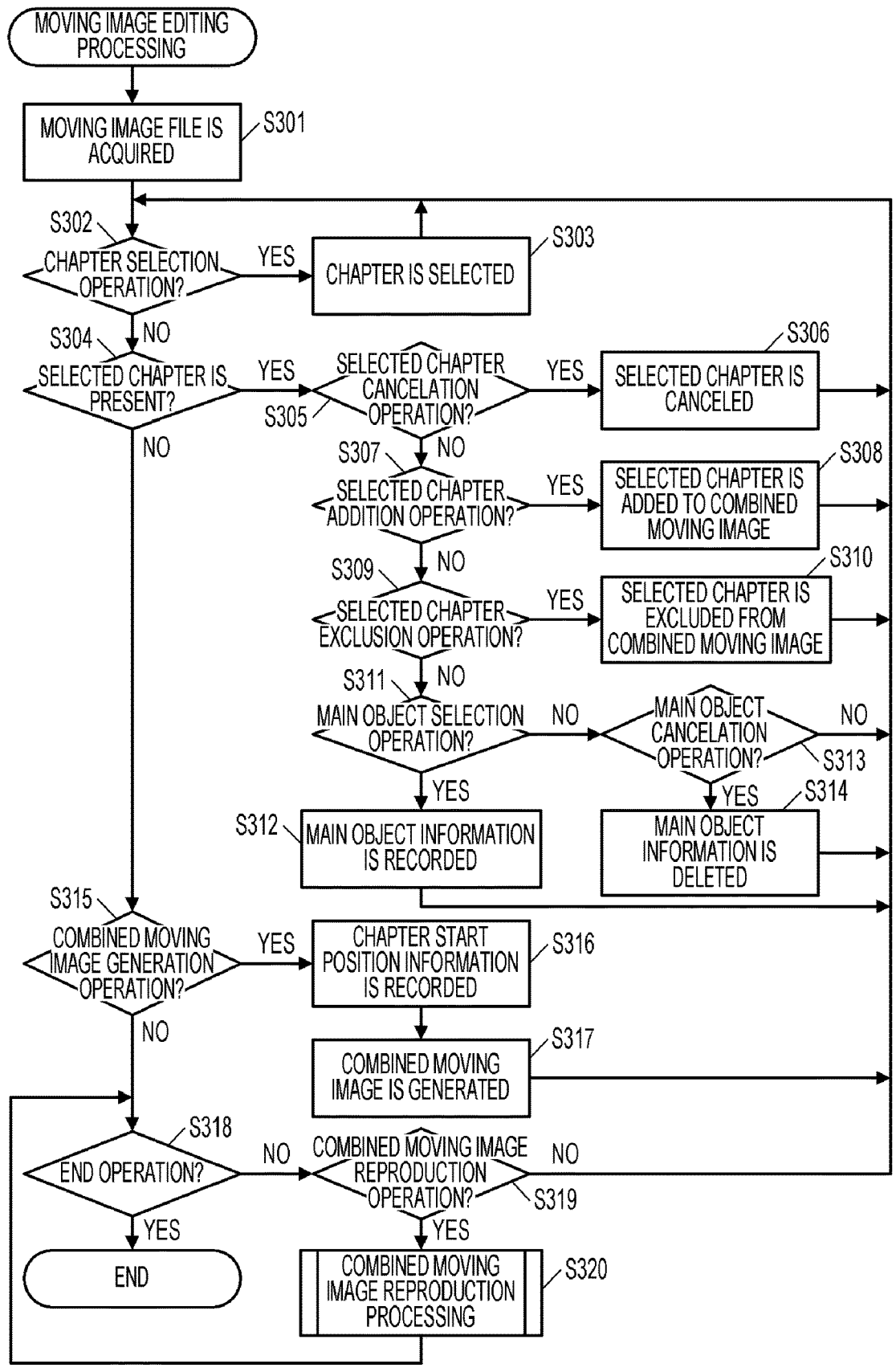
FIG. 3 is a flowchart illustrating an example of moving image editing processing according to Example 1.

FIG. 3 is a flowchart of moving image editing processing performed by the electronic apparatus 100. This processing is realized by loading the program recorded in the nonvolatile memory 103 into the memory 102 and executing the loaded program by the CPU 101. The processing in FIG. 3 is started when the power supply of the electronic apparatus 100 is turned on, a VR moving image (moving image which is VR content) is selected among the images recorded on the storage medium 108 and the images acquired from the communication destination, and transition to the editing mode is designated. In the present example, the VR moving image is divided into a plurality of chapters (partial moving images), one or more chapters are selected from the plurality of chapters by the processing in FIG. 3, and a moving image composed of the selected chapters (combined moving image; moving image in digest format) is generated.

In step S301, the CPU 101 acquires a moving image file of a VR moving image.

In step S302, the CPU 101 determines whether or not a selection operation for selecting a chapter of the VR moving image acquired in step S301 has been performed on the operation unit 106. Where the selection operation has been performed, the processing advances to step S303, and where the selection operation has not been performed, the processing advances to step S304.

In step S303, the CPU 101 selects one of the plurality of chapters of the VR moving image, which has been acquired in step S301, on the basis of the selection operation in step S302, and sets the selected chapter in a selected state.

In step S304, the CPU 101 determines whether or not there is a chapter (selected chapter) which has been set to the selected state in step S303. Where there is a selected chapter, the processing advances to step S305; otherwise, the processing advances to step S315.

In step S305, the CPU 101 determines whether or not a cancellation operation for canceling the selected state of the selected chapter has been performed on the operation unit 106. Where the cancellation operation has been performed, the processing advances to step S306; otherwise, the processing advances to step S307.

In step S306, the CPU 101 sets the selected chapter to the canceled state on the basis of the cancellation operation in step S305.

In step S307, the CPU 101 determines whether or not an addition operation for adding the selected chapter to a combined moving image has been performed on the operation unit 106. Where the addition operation has been performed, the processing advances to step S308; otherwise, the processing advances to step S309.

In step S308, the CPU 101 sets the selected chapter to the addition state of being added to the combined moving image on basis of the addition operation in step S307.

In step S309, the CPU 101 determines whether or not an exclusion operation for excluding the selected chapter, which has been set in the addition state in step S308, from the combined moving image has been performed on the operation unit 106. Where the exclusion operation has been performed, the processing advances to step S310; otherwise, the processing advances to step S311.

In step S310, the CPU 101 sets the state of the selected chapter to an exclusion state, which is not added to the combined moving image, on the basis of the exclusion operation in step S309.

In step S311, the CPU 101 determines whether or not a selection operation for selecting a main object (a main object of the selected chapter) has been performed on the operation unit 106. When the selection operation of the main object has been performed, the processing advances to step S312; otherwise, the processing advances to step S313.

In step S312, the CPU 101 selects the main object on the basis of the selection operation in step S311 and adds main object information on the selected main object to the metadata of the selected chapter. The main object information may or may not be information indicating the main object.

In step S313, the CPU 101 determines whether or not a cancellation operation for canceling the selection of the main object has been performed on the operation unit 106. Where the cancellation operation of the main object has been performed, the processing advances to step S314; otherwise, the processing advances to step S302.

In step S314, the CPU 101 deletes the main object information from the metadata of the selected chapter on the basis of the cancellation operation in step S313.

In step S315, the CPU 101 determines whether or not a moving image generation operation for generating a combined moving image has been performed on the operation unit 106. Where the moving image generation operation has been performed, the processing advances to step S316; otherwise, the processing advances to step S318.

In step S316, the CPU 101 records a chapter start position (the start timing of the additional chapter in the combined moving image) in the metadata with respect to the chapter in the added state (additional chapter).

In step S317, the CPU 101 generates a moving image file including moving image data on additional chapter and metadata as a moving image file of a combined moving image composed of additional chapters. It should be noted that other settings such as setting of the filter effect of the combined moving image, setting of the reproduction speed of the combined moving image, and the like may be possible.

In step S318, the CPU 101 determines whether or not an end operation for ending the moving image editing processing has been performed on the operation unit 106. Where the end operation has been performed, the moving image editing processing is ended; otherwise, the processing advances to step S319.

In step S319, the CPU 101 determines whether or not a reproduction operation for reproducing the combined moving image generated in step S317 has been performed. Where the reproduction operation has been performed, the processing advances to step S320; otherwise, the processing advances to step S302.

In step S320, the CPU 101 performs a reproduction processing for reproducing the combined moving image generated in step S317. As a result, the user can confirm whether or not a desired combined moving image has been created.

Figure 4:
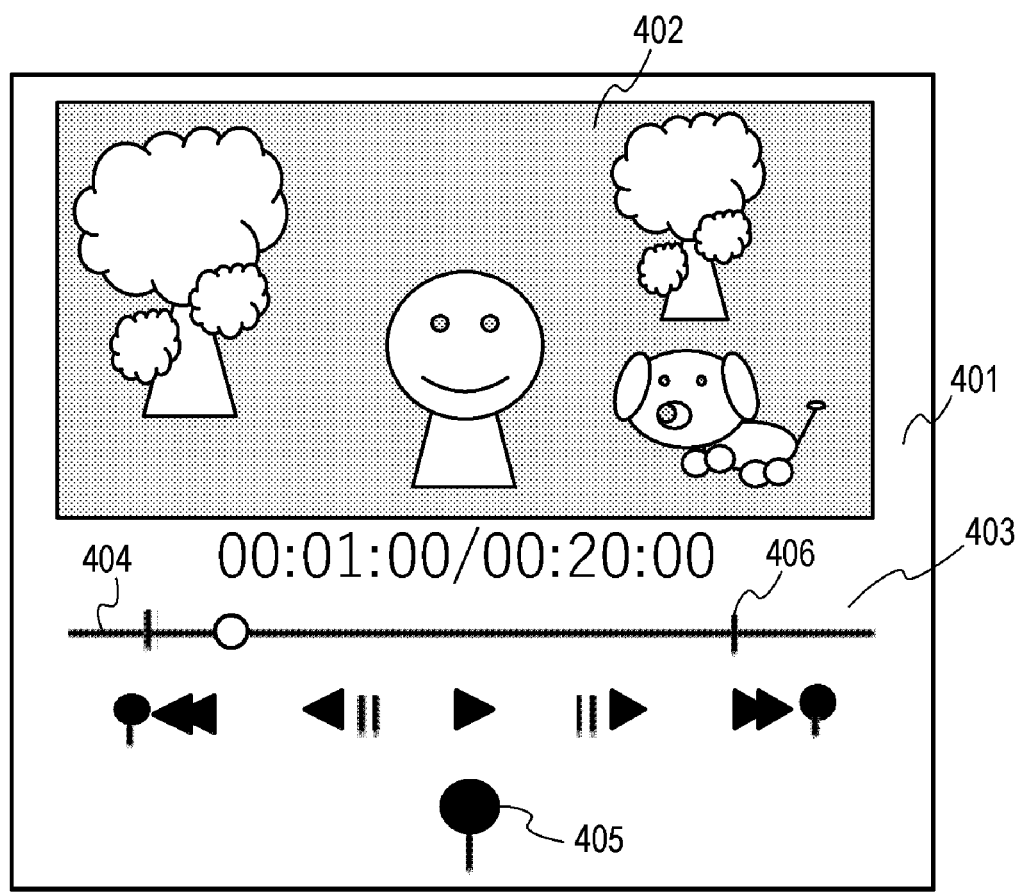
FIG. 4 illustrates a display example of the moving image editing processing according to Example 1.

FIG. 4 shows a display example of moving image editing processing. In the moving image editing processing, a moving image editing GUI 401 is displayed on the display unit 105. The moving image editing GUI 401 has a portion 402 for displaying a video image and an operation panel 403 for receiving various user operations. In the portion 402, the VR moving image acquired in step S301, the combined moving image generated in step S317, and the like are displayed. By using the operation panel 403, the user can instruct reproduction of moving images, stop of moving images, and the like. The operation panel 403 includes a time line 404 and a chapter selection button 405. The time line 404 indicates the time position of a displayed frame out of a plurality of frames of the moving image. The chapter selection button 405 is a button for switching the state of the chapter between a selected state and a non-selected state. For example, when the chapter selection button 405 is pressed, the state of the chapter is set to the selected state, and a tag 406 indicating the chapter in the selected state is displayed on the time line 404.

Figure 5:
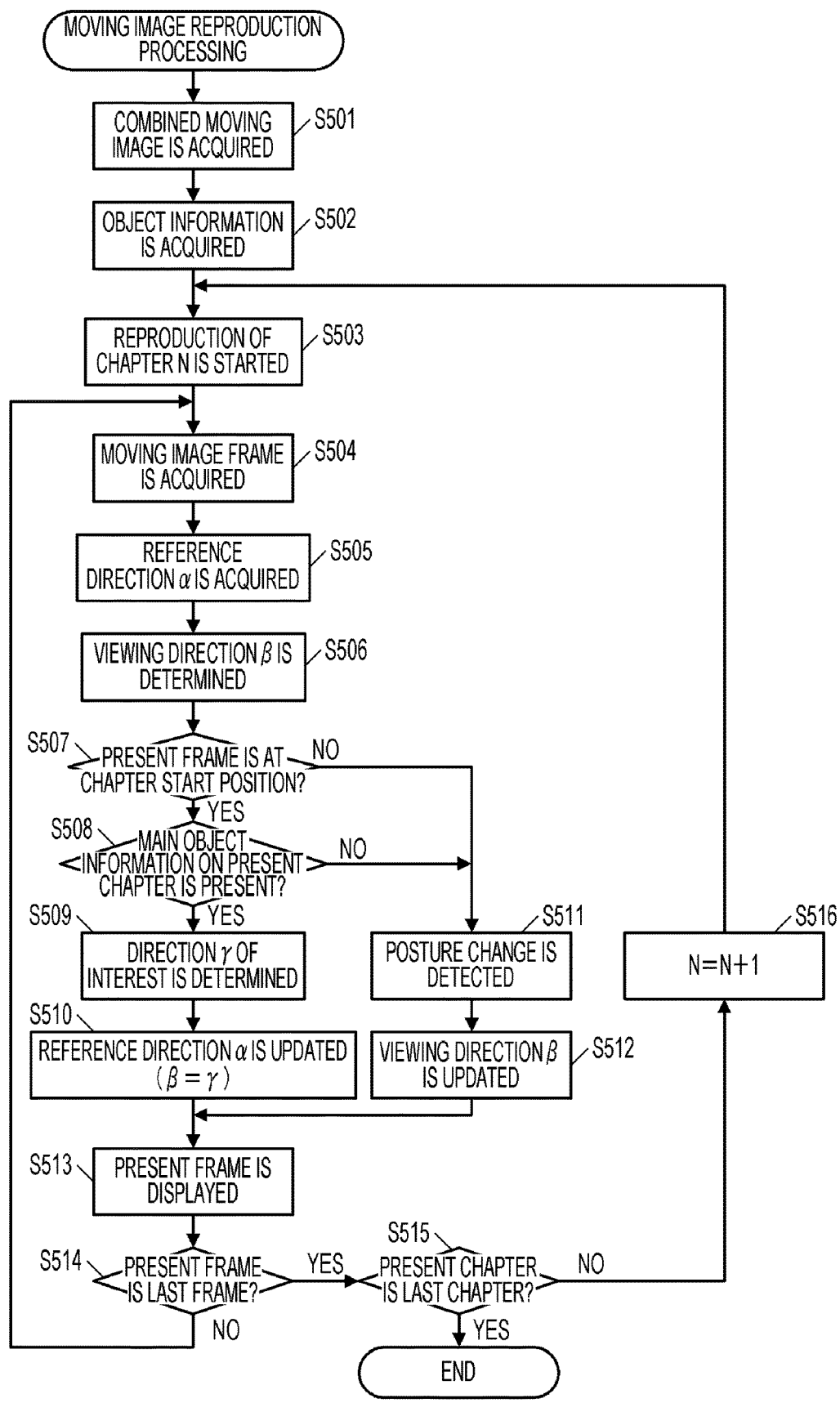
FIG. 5 is a flowchart illustrating an example of moving image reproduction processing according to Example 1.

FIG. 5 is a flowchart of moving image reproduction processing performed in the electronic apparatus 100. This processing is realized by loading the program recorded in the nonvolatile memory 103 into the memory 102 and executing the loaded program by the CPU 101. The processing of FIG. 5 is started when the power supply of the electronic apparatus 100 is turned on, a VR moving image is selected from the images recorded on the storage medium 108 or the moving images acquired from the communication destination, and a transition to the reproduction mode is designated.

In step S501, the CPU 101 acquires a moving image file of the VR moving image (a combined moving image generated in the moving image editing processing in FIG. 3).

In step S502, the CPU 101 acquires the main object information on the chapter from the moving image file acquired in step S501.

In step S503, the CPU 101 starts reproduction of a chapter N which is the N-th chapter (N is an integer of 1 or more) in the moving image file acquired in step S501. The initial value of N is, for example, 1.

In step S504, the CPU 101 acquires one frame of the chapter N. In the present example, the processing of step S504 is repeated a plurality of times. A plurality of frames is thus acquired in chronological order.

In step S505, the CPU 101 acquires a reference direction α which is a direction from the user in the VR space of FIG. 2C and is a reference direction for determining the display range. For example, a predetermined direction is acquired as the reference direction α. The predetermined direction is not particularly limited, and is a direction toward a position corresponding to the front face of the image capturing apparatus at the time the image of the chapter N is captured. In the present example, the reference direction α can be sometimes updated. In that case, the updated reference direction α is acquired. When the start position (first) frame of the chapter N has been acquired in step S504, a predetermined direction may be acquired as the reference direction α instead of the updated reference direction α.

In step S506, the CPU 101 determines a viewing direction β, which is a direction in which the user is looking in the VR space and is the direction from the user in the VR space, on the basis of the posture information obtained from the posture detection unit 113.

In step S507, the CPU 101 determines whether or not the frame acquired in step S504 is a frame at the start position of the chapter N. Where the acquired frame is a frame at the start position, the processing advances to step S508; otherwise, the processing advances to step S511.

In step S508, the CPU 101 determines the presence or absence of main object information in the metadata of the chapter N. Where the main object information is present, the processing advances to step S509; otherwise, the processing advances to step S511.

In step S509, the CPU 101 determines a direction γ of interest, which is a direction from the user to the main object in the VR space, on the basis of the main object information of the chapter N.

Figure 6:
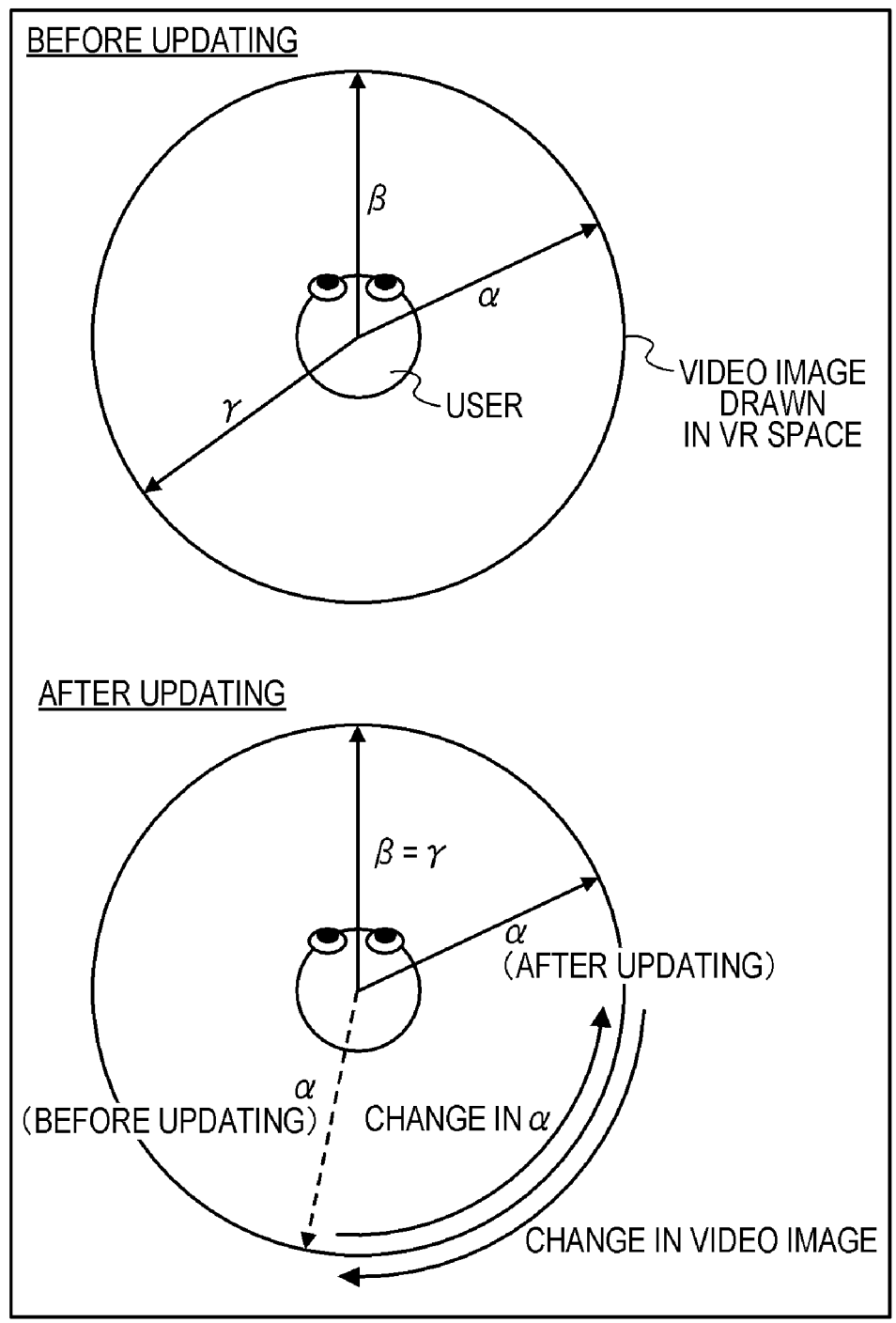
FIG. 6 illustrates an example of updating a reference direction according to Example 1.

In step S510, the CPU 101 updates the reference direction α so that the viewing direction determined in step S506 substantially coincides with the direction γ of interest determined in step S511 ("substantially" includes "completely"). As shown in FIG. 6, where the reference direction α is updated, the video image drawn in the VR space can be rotated around the user, and the viewing direction β can be substantially matched with the direction γ of interest.

In step S511, the CPU 101 detects a change in the posture of the electronic apparatus 100, that is, a change in the direction in which the user is looking, on the basis of the posture information obtained from the posture detection unit 113.

In step S512, the CPU 101 updates the viewing direction β, which has been determined in step S506, on the basis of the detection result in step S511.

In step S513, on the basis of the viewing direction β, the CPU 101 determines a range including a position at which the viewing direction β is directed as a display range with respect to the frame acquired in step S504, and displays the video image of the determined display range on the display unit 105. When the reference direction α is updated in step S510, the display range is determined so that the main object is displayed independently of the posture of the electronic apparatus 100. In addition, when a change in the posture of the electronic apparatus 100 is detected in step S511, the position of the display range is changed so as to follow the change in the posture.

In step S514, the CPU 101 determines whether or not the frame acquired in step S504 is the last frame of the chapter N. Where the acquired frame is the last frame, the processing advances to step S515; otherwise, the processing advances to step S504.

In step S515, the CPU 101 determines whether or not the chapter N is the last chapter. Where the chapter N is the last chapter, the moving image reproduction processing is ended; otherwise, the processing advances to step S516.

In step S516, the CPU 101 adds 1 to the variable N.

As described above, according to the present example, when a chapter start frame (a frame corresponding to the start timing of a chapter) is reproduced, control is performed so that the main object is displayed independently of the posture of the electronic apparatus 100. When another frame is then reproduced, control is performed so that that a different display range is displayed according to the posture of the electronic apparatus 100. As a result, it is possible to improve the visibility when the user is viewing a moving image in which a part of a wide-range image is displayed. Specifically, it is possible to allow the user to properly view a highlight of a moving image having a wide-range video image, while imparting an immersive feeling or a realistic feeling which is the real thrill of VR display to the user.

It is to be noted that the reference direction α may be updated (adjusted) regardless of presence or absence of main object information. For example, in the case of a VR moving image captured without changing the posture of the image capturing apparatus, it is conceivable that there are users who want to reset the display range at the start of a chapter. Therefore, at the start of a chapter, the reference direction α acquired in step S505 may be used as the direction γ of interest to update the reference direction α. As a result, at the start of the chapter, the display range can be determined so that the user can see the video image in the reference direction α before updating.

The control may be performed so that the relative position of the main object of the chapter start frame with respect to the display range of the chapter start frame substantially coincides with the relative position of the main object of a previous frame (frame one frame before the chapter start frame) with respect to the display range of the previous frame. Specifically, in step S510, the reference direction α may be updated so that the position of the main object at the start of the present chapter substantially coincides with the position of the main object at the end of the previous chapter.

In the following cases, control may be performed so that the range corresponding to the detected posture is displayed on the display unit 105 as the display range. That is, in the following cases, updating of the reference direction α may be canceled. In these cases, the user can easily view the main object and the like without updating the reference direction α. Furthermore, it is also possible to suppress the deterioration of the VR experience (immersive feeling or realistic feeling) by determining the display range in accordance with the detected posture without updating the reference direction α.

- The case where the main object is included in the range corresponding to the detected posture. That is, the case where the main object is included in the display range corresponding to the reference direction α before updating.
- The case where the difference between the relative position of the main object of the chapter start frame with respect to the range of the chapter start frame corresponding to the detected posture and the relative position of the main object of the previous frame with respect to the display range of the previous frame is less than the predetermined value. That is, the case where the difference between the reference direction α before updating and the reference direction α after updating is less than the predetermined value.
- The case where the main object of the chapter start frame is included in the display range of the previous frame. That is, the case where the position of the main object at the start of the present chapter is within the display range before updating.

Where the reference direction α is changed at one time, the position of the display range changes greatly at one time, which may give the user discomfort. Therefore, the reference direction α may be gradually changed in several frames to change gradually the position of the display range. However, when switching of the capturing location of a video image, switching of the scenes, or the like occurs due to switching of chapters, the reference direction α may be changed at one time. That is, control may be performed so that the difference between the display range of the chapter start frame and the display range of the previous frame is limited to less than a predetermined value. Further, when the change amount of the image from the previous frame to the chapter start frame is larger than the predetermined amount, control may be performed so that the difference between the display range of the chapter start frame and the display range of the previous frame is not limited to less than the predetermined value.

In the moving image editing processing, each of a plurality of objects may be selected as a main object with respect to one chapter. In this case, the reference direction α may be updated so that the plurality of main objects falls within the display range.

In the example described hereinabove, the main object is selected after the chapter is selected in the moving image editing process, but this example is not limiting. In addition to selecting the main object, the chapter may be selected in accordance with the selection operation of the main object in a state in which the chapter is not selected.

In the example described hereinabove, a combined moving image composed of chapters extracted from one VR moving image is generated, but this example is not limiting. For example, the electronic apparatus 100 may have a moving image capturing function and may generate a combined moving image including, as chapters, each of a plurality of VR moving images obtained by a plurality of image capturing operations.

Figure 7:
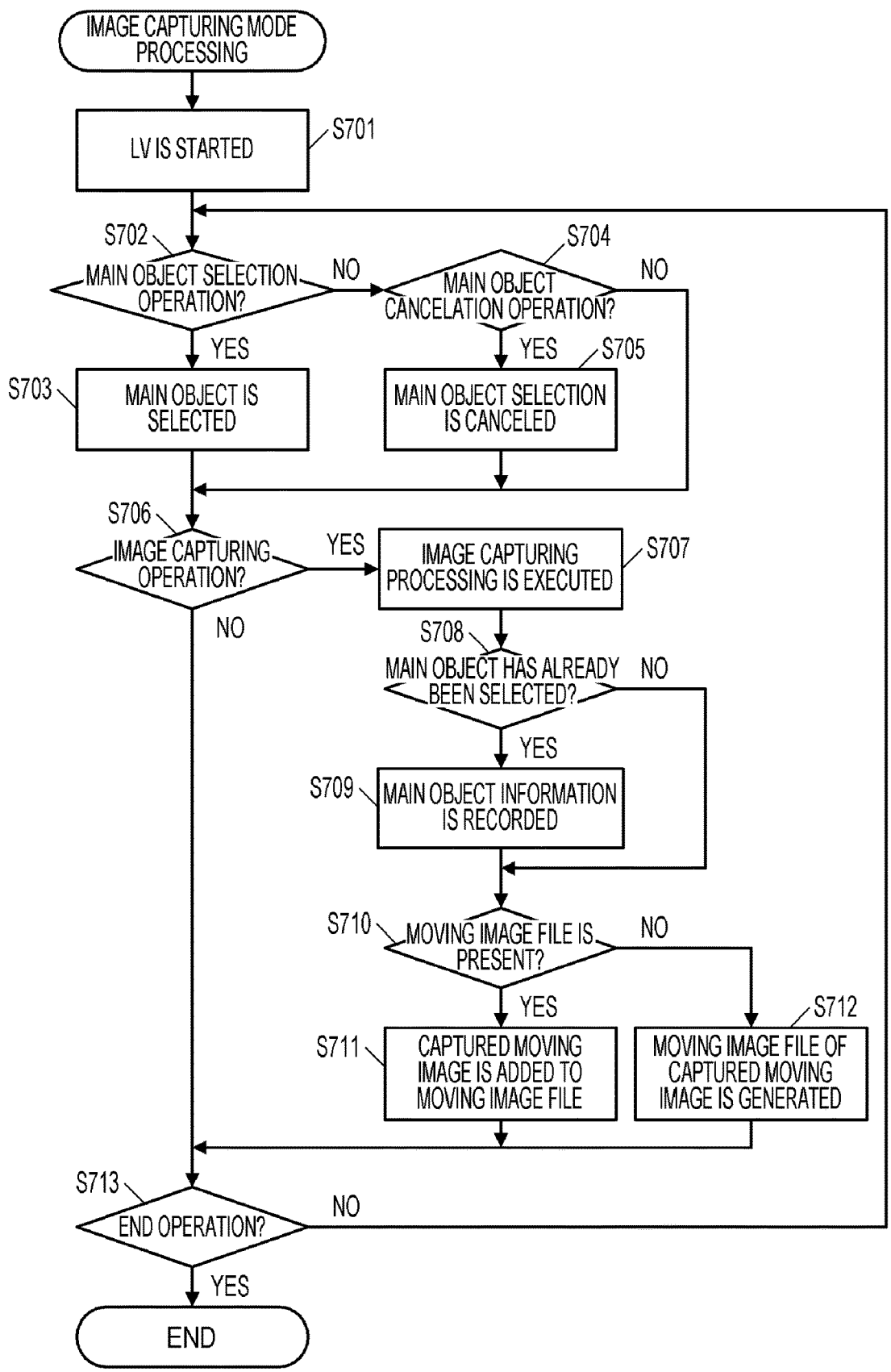
FIG. 7 is a flowchart illustrating an example of image capturing mode processing according to Example 1.

FIG. 7 is a flowchart of image capturing mode processing performed in the electronic apparatus 100. This processing is realized by loading the program recorded in the nonvolatile memory 103 into the memory 102 and executing the loaded program by the CPU 101. The processing of FIG. 7 is started when the power supply of the electronic apparatus 100 is turned on and a transition to the image capturing mode is designated.

In step S701, the CPU 101 starts LV control for displaying a live view screen representing the present state of the object on the display unit 105.

In step S702, similarly to step S311 in FIG. 3, the CPU 101 determines whether or not a selection operation for selecting the main object has been performed on the operation unit 106. Where the main object selection operation has been performed, the processing advances to step S703; otherwise, the processing advances to step S704.

In step S703, the CPU 101 selects the main object on the basis of the selection operation in step S702.

In step S704, similarly to step S313 in FIG. 3, the CPU 101 determines whether or not a cancellation operation for canceling the selection of the main object has been performed on the operation unit 106. Where the cancellation operation of the main object has been performed, the processing advances to step S705; otherwise, the processing advances to step S706.

In step S705, the CPU 101 cancels the selection of the main object on the basis of the cancellation operation in step S704.

In step S706, the CPU 101 determines whether or not an image capturing operation for capturing a VR moving image has been performed on the operation unit 106. Where the image capturing operation has been performed, the processing advances to step S707; otherwise, the processing advances to step S713. The user may start capturing a moving image by pressing a shutter button or selecting an item instructing start and end of image capturing, and may stop the image capturing by the same operation as that performed to start the image capturing. Further, after a predetermined time, such as 1 min or 2 min, elapses, the capturing of the moving image may be stopped automatically.

In step S707, the CPU 101 executes the image capturing processing and acquires moving image data on the captured VR moving image.

In step S708, the CPU 101 determines whether or not a main object has been selected. Where the main object has been selected, the processing advances to step S709; otherwise, the processing advances to step S710.

In step S709, the CPU 101 adds main object information on the selected main object to the metadata of the moving image data acquired in step S707.

In step S710, the CPU 101 determines whether or not a moving image file of a combined moving image has been generated on the storage medium 108. Where the moving image file has already been generated, the processing advances to step S711; otherwise, the processing advances to step S712.

In step S711, the CPU 101 adds the moving image data acquired in step S707 and metadata thereof as the data of the last chapter to the moving image file already recorded in the storage medium 108.

In step S712, the CPU 101 generates a moving image file including the moving image data acquired in step S707 and metadata thereof and records the generated moving image file in the storage medium 108.

In step S713, the CPU 101 determines whether or not an end operation for ending the image capturing mode processing has been performed on the operation unit 106. When the end operation of the image capturing mode processing has been performed, the image capturing mode processing is ended; otherwise, the processing advances to step S702.

Example 2

Hereinafter, an electronic apparatus according to Example 2 of the present invention will be described. In Example 2, by contrast with Example 1, an editing method and a reproducing method of a moving image not limited to the moving image of a digest format will be described by way of example. The configuration diagram and external view of the electronic apparatus 100 as a display control apparatus to which the present invention can be applied are the same as shown in FIGS. 1A and 1B, respectively, and the external view of VR goggles (head-mounted adapter) on which the electronic apparatus 100 can be mounted is the same as shown in FIG. 1C.

Figure 8:
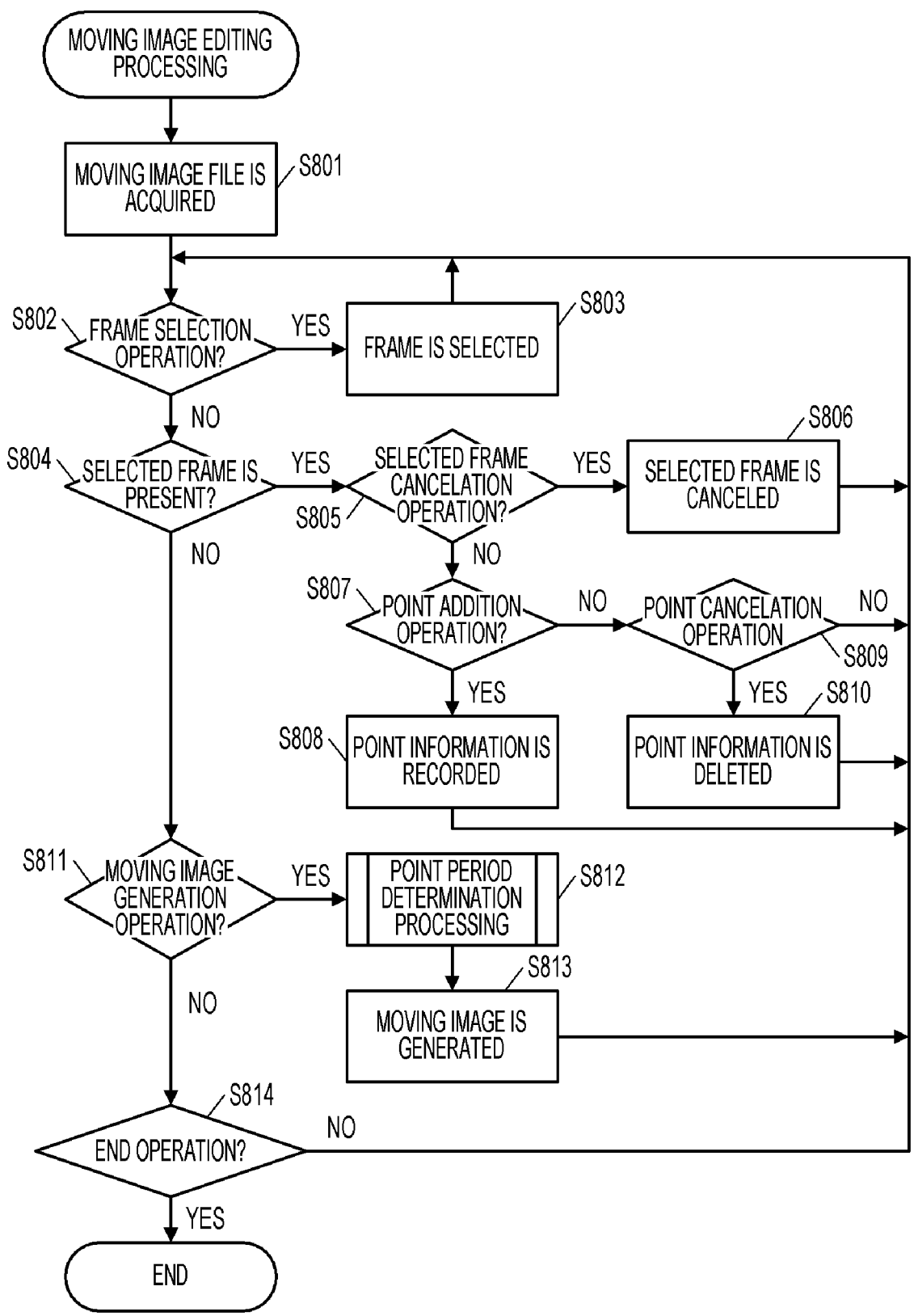
FIG. 8 is a flowchart illustrating an example of moving image editing processing according to Example 2.

FIG. 8 shows a flowchart of moving image editing processing performed in the electronic apparatus 100. This processing is realized by loading the program recorded in the nonvolatile memory 103 into the memory 102 and executing the loaded program by the CPU 101. The processing of FIG. 8 is started when the power supply of the electronic apparatus 100 is turned on, a VR moving image (moving image which is VR content) is selected among the images recorded on the storage medium 108 and the images acquired from the communication destination, and a transition to the editing mode is designated.

In step S801, the CPU 101 acquires a moving image file of a VR moving image.

In step S802, the CPU 101 determines whether or not a selection operation for selecting the frame of the VR moving image acquired in step S801 has been performed on the operation unit 106. Where a selection operation has been performed, the processing advances to step S803; otherwise, the processing advances to step S804.

In step S803, the CPU 101 selects one of a plurality of frames of the VR moving image, which has been acquired in step S801, on the basis of the selection operation in step S802, and sets the selected frame to the selected state.

In step S804, the CPU 101 determines the presence or absence of a frame (selected frame) that has been set to the selected state in step S803. Where there is a selected frame, the processing advances to step S805; otherwise, the processing advances to step S811.

In step S805, the CPU 101 determines whether or not a cancellation operation for canceling the selected state of the selected frame has been performed on the operation unit 106. Where the cancellation operation has been performed, the processing advances to step S806; otherwise, the processing advances to step S807.

In step S806, the CPU 101 sets the selected frame to the canceled state on the basis of the cancellation operation in step S805.

In step S807, the CPU 101 determines whether or not an addition operation for adding a point to the selected frame has been performed on the operating unit 106. Where the addition operation has been performed, the processing advances to step S808; otherwise, the processing advances to step S809.

In step S808, the CPU 101 adds point information to the metadata of the selected frame on the basis of the addition operation in step S807. The addition operation includes an operation for indicating the main object, and the point information includes main object information on the indicated main object.

In step S809, the CPU 101 determines whether or not a cancellation operation for canceling the point of the selected frame has been performed on the operation unit 106. When the point cancellation operation has been performed, the processing advances to step S810; otherwise, the processing advances to step S802.

In step S810, the CPU 101 deletes the point information from the metadata of the selected frame on the basis of the cancellation operation in step S809.

In step S811, the CPU 101 determines whether or not a moving image generation operation for generating a moving image has been performed on the operation unit 106. Where the moving image generation operation has been performed, the processing advances to step S812; otherwise, the processing advances to step S814.

In step S812, the CPU 101 performs a point period determination processing to be described hereinbelow.

In step S813, the CPU 101 generates a moving image file of a moving image in which point information is added as necessary to a frame.

In step S814, the CPU 101 determines whether or not an end operation for ending the moving image editing process has been performed on the operation unit 106. Where the end operation has been performed, the moving image editing processing is ended; otherwise, the processing advances to step S802.

Figure 9:
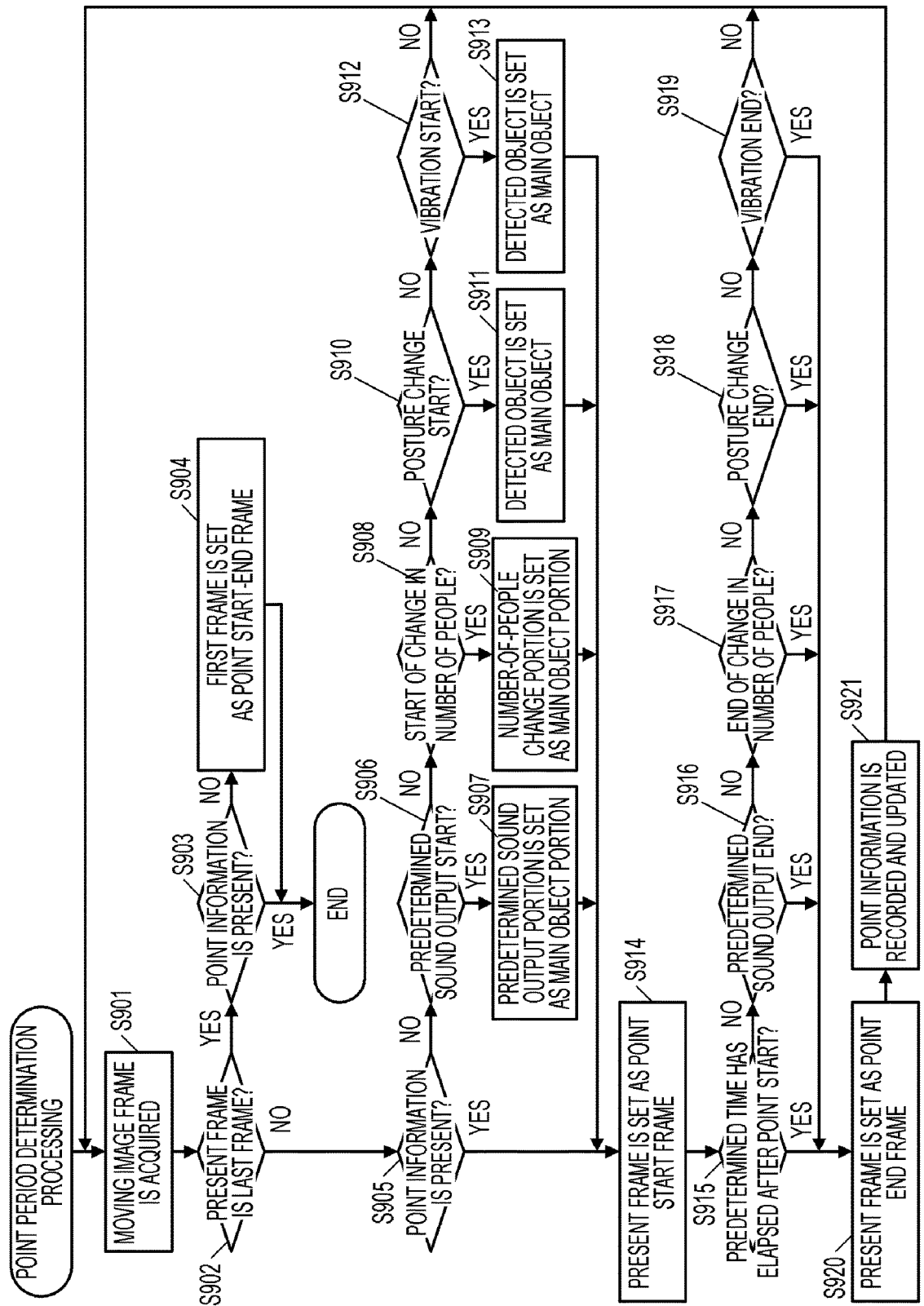
FIG. 9 is a flowchart illustrating an example of point period determination processing according to Example 2.

FIG. 9 is a flowchart of the point period determination processing (step S812) performed in the electronic apparatus 100. This processing is realized by loading the program recorded in the nonvolatile memory 103 into the memory 102 and executing the loaded program by the CPU 101.

In step S901, the CPU 101 acquires a frame of the VR moving image acquired in step S801. In this example, the processing of step S901 is repeated a plurality of times. As a result, a plurality of frames is acquired in chronological order.

In step S902, the CPU 101 determines whether or not the frame acquired in step S901 is the last frame. Where the acquired frame is the last frame, the processing advances to step S903; otherwise, the processing advances to step S905.

In step S903, the CPU 101 determines the presence or absence of a frame in which point information is added to the metadata. Where there is a frame is which point information is added to the metadata, the point period determination processing is ended; otherwise, the processing advances to step S904.

In step S904, the CPU 101 sets the first frame of the VR moving image acquired in step S801 as a point start frame and a point end frame. Specifically, the CPU 101 adds point information indicating that the frame is a point start frame and a point end frame to the metadata of the first frame. In the present example, the period from the point start frame to the point end frame can be set as a point period. In step S904, the period of only the first frame is set as the point period.

In step S905, the CPU 101 determines the presence or absence of point information in the metadata of the frame acquired in step S901. Where the point information is present, the processing advances to step S914; otherwise, the processing advances to step S906. When the point information is present, this means that the frame acquired in step S901 is designated as the point start frame by the user.

In step S906, the CPU 101 determines whether or not the output of a predetermined sound (a characteristic sound such as a cheer) starts in the frame acquired in step S901. Where the output of the predetermined sound starts, the processing advances to step S907; otherwise the processing advances to step S908.

In step S907, the CPU 101 selects a portion of the frame acquired in step S901 from which a predetermined sound is emitted as a portion of the main object.

In step S908, the CPU 101 determines whether or not a change in the number of objects starts in the frame acquired in step S901. Where the change in the number of objects starts, the processing advances to step S909; otherwise, the processing advances to step S910. The object here is a predetermined type of object such as a person, a vehicle (automobile, airplane, and the like), a natural object (tree, mountain, cloud, and the like), and the like. In the present example, it is determined whether or not a change in the number of people (increase or decrease in the number of people) starts.

In step S909, the CPU 101 selects a portion of the frame acquired in step S901 in which the number of people has changed as a portion of the main object. When the number of people has decreased, one of a plurality of remaining persons may be selected as the main object, or a portion including all remaining persons may be selected as a part of the main object.

In step S910, the CPU 101 determines whether or not the frame acquired in step S901 corresponds to the start timing of the posture change of the image capturing apparatus at the time of capturing the VR moving image acquired in step S801. When the frame corresponds to the start timing of the posture change, the processing advances to step S911; otherwise, the processing advances to step S912.

In step S911, the CPU 101 automatically detects the main object from the frame acquired in step S901. For example, a predetermined type of object, an object having a predetermined size or more, or the like is automatically detected as the main object.

In step S912, the CPU 101 determines whether or not the frame acquired in step S901 corresponds to the start timing of vibration of the image capturing apparatus at the time of capturing the VR moving image acquired in step S801. When the frame corresponds to the vibration start timing, the processing advances to step S913; otherwise, the processing advances to step S901.

In step S913, the CPU 101 automatically detects the main object from the frame acquired in step S901. For example, a predetermined type of object, an object having a predetermined size or more, or the like is automatically detected as a main object.

In step S914, the CPU 101 determines the frame acquired in step S901 as a point start frame.

In step S915, the CPU 101 determines whether or not the frame acquired in step S901 is a frame after a predetermined number of frames (predetermined time) from the immediately preceding point start frame. Where the frame is after a predetermined number of frames from the point start frame, the processing advances to step S920; otherwise, the processing advances to step S916.

In step S916, the CPU 101 determines whether or not the output of a predetermined sound (a characteristic sound such as a cheer) ends in the frame acquired in step S901. If the output of the predetermined sound is ended, the processing advances to step S920, otherwise, the processing advances to step S917.

In step S917, the CPU 101 determines whether or not the change in the number of objects is ended in the frame acquired in step S901. Where the change in the number of objects is ended, the processing advances to step S920; otherwise, the processing advances to step S918. The object here is a predetermined type of object such as a person, a vehicle (automobile, airplane, and the like), a natural object (tree, mountain, cloud, and the like), and the like. In the present example, it is determined whether or not a change in the number of people (increase or decrease in the number of people) is ended.

In step S918, the CPU 101 determines whether the frame acquired in step S901 corresponds to the end timing of the posture change of the image capturing apparatus at the time of capturing the VR moving image acquired in step S801. When the frame corresponds to the end timing of the posture change, the processing advances to step S920; otherwise, the processing advances to step S919.

In step S919, the CPU 101 determines whether or not the frame acquired in step S901 corresponds to the end timing of the vibration of the image capturing apparatus at the time of capturing the VR moving image acquired in step S801. When the frame corresponds to the end timing of vibration, the processing advances to step S920; otherwise the processing advances to step S901.

In step S920, the CPU 101 determines the frame acquired in step S901 as a point end frame.

In step S921, the CPU 101 adds point information to the metadata of the frame acquired in step S901 or updates the point information of the frame on the basis of the results of preceding processing. Where no point information has been added to the frame acquired in step S901, point information is generated and added, and where point information has been added to the frame acquired in step S901, the added point information is updated. The point information added in step S921 indicates that the frame is a point start frame, a point end frame, or another frame in the point period. Further, the point information added in step S921 includes main object information on the main object (portion of the main object). The main object information similar to the point start frame is added to the frame which is not the point start frame among the plurality of frames in the point period. The main object information indicating the portion where the predetermined sound is emitted as the main object portion is added to, for example, each frame in the point period from the point start frame in which the output of the predetermined sound starts.

The number of point periods in one VR moving image is not particularly limited. For example, one point period or a plurality of point periods may be set for one chapter, one scene, one moving image, or the like. A frame immediately preceding the above-mentioned point end frame may be set as a point end frame. That is, the above-mentioned point end frame may be a start frame of a period other than the point period. A method of determining the point period (point start frame or point end frame) is not limited to the above method. Instead of setting a point period at the time of moving image editing, the electronic apparatus 100 may have a moving image capturing function and may set a point period at the time of image capturing.

Figure 10:
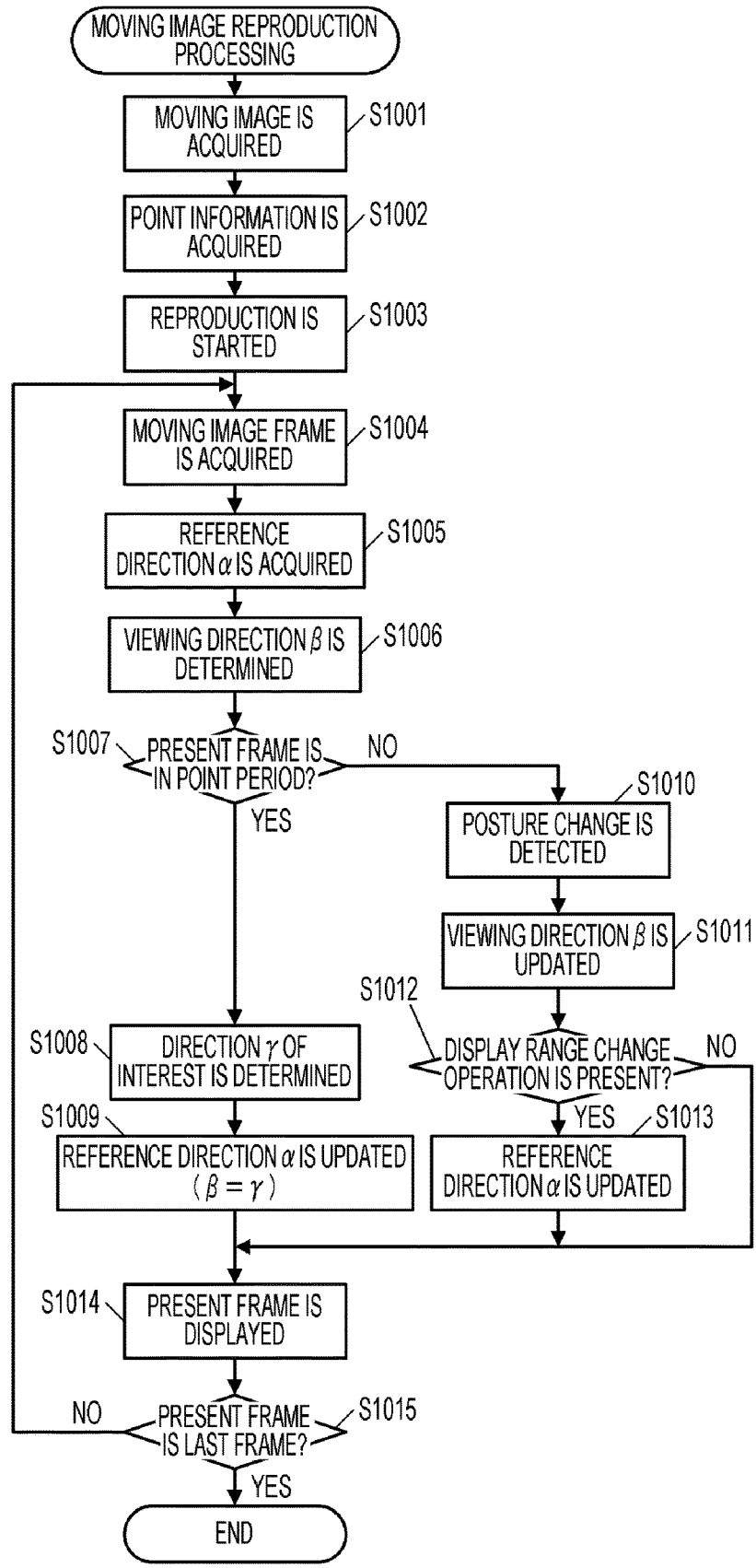
FIG. 10 is a flowchart illustrating an example of moving image reproduction processing according to Example 2.

FIG. 10 is a flowchart of moving image reproduction processing performed by the electronic apparatus 100. This processing is realized by loading the program recorded in the nonvolatile memory 103 into the memory 102 and executing the loaded program by the CPU 101. The processing of FIG. 10 is started when the power supply of the electronic apparatus 100 is turned on, a VR moving image is selected from the images recorded on the storage medium 108 or the moving images acquired from the communication destination, and a transition to the reproduction mode is designated.

In step S1001, the CPU 101 acquires a moving image file of a VR moving image (a moving image generated in the moving image editing processing in FIG. 8).

In step S1002, the CPU 101 acquires frame point information from the moving image file acquired in step S1001.

In step S1003, the CPU 101 starts reproduction of the moving image file acquired in step S1001.

In step S1004, the CPU 101 acquires one frame of the moving image file acquired in step S1001. In the present example, the processing of step S1004 is repeated a plurality of times. As a result, a plurality of frames is acquired in chronological order.

In step S1005, the CPU 101 acquires the reference direction α.

In step S1006, the CPU 101 determines the viewing direction β on the basis of the posture information obtained from the posture detection unit 113.

In step S1007, the CPU 101 determines whether or not the frame acquired in step S1004 is a frame in the point period on the basis of the point information acquired in step S1002. Where the acquired frame is a frame in the point period, the processing advances to step S1008; otherwise the processing advances to step S1010.

In step S1008, the CPU 101 determines the direction γ of interest on the basis of the main object information of the frame acquired in step S1004.

In step S1009, the CPU 101 updates the reference direction α so that the viewing direction β determined in step S1006 substantially coincides with the direction γ of interest determined in step S1008.

In step S1010, the CPU 101 detects a change in the posture of the electronic apparatus 100, that is, a change in the direction in which the user is looking, on the basis of the posture information obtained from the posture detection unit 113.

In step S1011, the CPU 101 updates the viewing direction β, which has been determined in step S1006, on the basis of the detection result in step S1010.

In step S1012, the CPU 101 determines the presence or absence of a user operation (display range changing operation; touch-move, flick, button operation, and the like) for changing the display range. When there is a display range changing operation, the processing advances to step S1013, otherwise, the processing advances to step S1014.

In step S1013, the CPU 101 updates the reference direction α on the basis of the display range changing operation performed in step S1012.

In step S1014, on the basis of the viewing direction β, the CPU 101 determines a range including a position at which the viewing direction β is directed as a display range with respect to the frame acquired in step S1004, and displays the video image of the determined display range on the display unit 105. When the reference direction α is updated in step S1009, the display range is determined so that the main object is displayed independently of the posture of the electronic apparatus 100. When a change in the posture of the electronic apparatus 100 is detected in step S1010, the position of the display range is changed so as to follow the change in the posture. When the display range changing operation is performed in step S1012, the display range is changed in accordance with the display range changing operation. For example, where the user performs a display range changing operation for increasing the angle A1 by 30 degrees in a state in which the reference direction α and the viewing direction β (the direction in which the user is looking) are the directions at angles A1 and A2=0 degrees in FIG. 2C, the reference direction α is changed to the direction at angle A1=30 degrees and angle A2=0 degrees. As a result, in a state in which the viewing direction β is at angles A1, A2=0 degrees, the user can see the range in the direction at angle A1=30 degrees and angle A2=0 degrees.

In step S1015, the CPU 101 determines whether or not the frame acquired in step S1004 is the last frame. Where the acquired frame is the last frame, the moving image reproduction processing is ended; otherwise, the processing advances to step S1004.

As described above, according to the present example, the control is performed so that the main object is displayed independently of the posture of the electronic apparatus 100 in the appropriately set point period. Further, the control is performed so that a different display range is displayed according to the posture of the electronic apparatus 100 in another period. As a result, it is possible to improve the visibility when the user is viewing a moving image in which a part of a wide-range image is displayed. Specifically, it is possible to allow the user to properly view a highlight of a moving image having a wide-range video image, while imparting an immersive feeling or a realistic feeling which is the real thrill of VR display to the user.

The above-mentioned various kinds of control described as being performed by the CPU 101 may be performed by one piece of hardware, or the entire apparatus may be controlled by sharing the processing among a plurality of pieces of hardware.

Although the present invention has been described in detail based on preferred embodiments thereof, it is to be understood that the present invention is not limited to these specific embodiments, and various embodiments which do not depart from the gist of the present invention are included in the present invention. Furthermore, each of the above-described embodiments merely illustrates one embodiment of the present invention, and these embodiments can be combined as appropriate.

In the above-described embodiment, the present invention is applied, by way of example, to the electronic apparatus 100 such as a smartphone, but the present invention is not limited to this example and can be applied to any electronic apparatus that can be controlled so as to display a portion of a VR image. It goes without saying that the present invention can also be applied to a head-mounted display (HMD) instead of a smartphone. Further, the present invention is applicable to personal computers, PDAs, mobile phone terminals, portable image viewers, printers equipped with displays, digital photo frames, and the like. Further, the present invention can be applied to a music player, a game machine, an electronic book reader, a tablet terminal, a smartphone, a projection apparatus, a household electronic apparatus having a display, a vehicle on-board apparatus, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-000557, filed on Jan. 5, 2018, which is hereby incorporated by reference herein in its entirety.

What is claimed is:

1. An electronic apparatus comprising:
a detection unit configured to detect a posture of a display unit;
a reproduction unit configured to reproduce a moving image;
a change unit configured to change a display range, which is a partial range of a frame of the moving image and is to be displayed on the display unit, according to the posture of the display unit detected by the detection unit; and
a control unit configured to perform control so that in a case where a first frame at a predetermined position of the moving image is reproduced, a partial range of the first frame in which a main object is displayed on the display unit regardless of whether the posture detected by the detection unit is a first posture or a second posture is displayed, and perform control so that in a case where a second frame, which is at a different position from the first frame, of the moving image is reproduced, a partial range of the second frame depending on a third posture detected by the detection unit is displayed,
wherein a direction of the first posture is different from that of the second posture.

2. The electronic apparatus according to claim 1, wherein the control unit performs control so that in a case where the first frame is reproduced, a direction of the partial range of the first frame in which the main object is displayed on the display unit is associated with either the first posture or the second posture detected by the detected unit, and
wherein the direction of the partial range of the first frame in which the main object is displayed on the display unit is apart from a direction of the partial range of the second frame, corresponding to a difference between either the first posture or the second posture detected by the detected unit and the third posture.

3. The electronic apparatus according to claim 1, wherein the control unit performs control so that in a case where the main object is not set in the first frame, a partial range of the first frame depending on either the first posture or the second posture detected by the detection unit is displayed on the display unit, even if the first frame is reproduced.

4. The electronic apparatus according to claim 1, wherein the predetermined position is corresponding to a start timing of a chapter of the moving image.

5. The electronic apparatus according to claim 1, further comprising
a setting unit configured to be capable of setting a period of the first frame.

6. The electronic apparatus according to claim 5, wherein the control unit performs control so that
a frame designated by a user,
a frame at which output of a predetermined sound starts,
a frame at which a change in the number of objects starts,
a frame corresponding to a start timing of a posture change of an image capturing apparatus at the time of capturing the moving image, or
a frame corresponding to a start timing of a vibration of the image capturing apparatus at the time of capturing the moving image becomes a start frame of the period.

7. The electronic apparatus according to claim 5, wherein the control unit performs control so that
a frame after a predetermined number of frames from a start frame of the period,
a frame at which output of a predetermined sound ends,
a frame at which a change in the number of objects ends,
a frame corresponding to an end timing of a posture change of an image capturing apparatus at the time of capturing the moving image, or a frame corresponding to an end timing of a vibration of the image capturing apparatus at the time of capturing the moving image becomes an end frame of the period.

8. The electronic apparatus according to claim 1, wherein a whole of a frame of the moving image has a field of view of more than 180 degrees.

9. The electronic apparatus according to claim 1, wherein the moving image is an omnidirectional image or a panoramic image.

10. A control method for an electronic apparatus, comprising:

a detection step of detecting a posture of a display unit;

a reproduction step of reproducing a moving image;

a change step of changing a display range, which is a partial range of a frame of the moving image and is to be displayed on the display unit, according to the posture of the display unit detected in the detection step; and a control step of performing control so that in a case where a first frame at a predetermined position of the moving image is reproduced, a partial range of the first frame in which a main object is displayed on the display unit regardless of whether the posture detected in the detection step is a first posture or a second posture is displayed, and perform control so that in a case where a second frame, which is at a different position from the first frame, of the moving image is reproduced, a partial range of the second frame depending on a third posture detected in the detection step is displayed, wherein a direction of the first posture is different from that of the second posture.

11. A non-transitory computer readable medium that stores a program, wherein the program causes a computer to execute:

a detection step of detecting a posture of a display unit;

a reproduction step of reproducing a moving image;

a change step of changing a display range, which is a partial range of a frame of the moving image and is to be displayed on the display unit, according to the posture of the display unit detected in the detection step; and a control step of performing control so that in a case where a first frame at a predetermined position of the moving image is reproduced, a partial range of the first frame in which a main object is displayed on the display unit regardless of whether the posture detected in the detection step is a first posture or a second posture is displayed, and perform control so that in a case where a second frame, which is at a different position from the first frame, of the moving image is reproduced, a partial range of the second frame depending on a third posture detected in the detection step is displayed, wherein a direction of the first posture is different from that of the second posture.

* * * * *